(12) United States Patent
South

(10) Patent No.: US 9,506,527 B2
(45) Date of Patent: Nov. 29, 2016

(54) POWER TRANSMISSION BELT

(75) Inventor: Bobbie E. South, Dryden, MI (US)

(73) Assignee: GATES CORPORATION, Denver, CO (US)

( * ) Notice: Subject to any disclaimer, the term of this patent is extended or adjusted under 35 U.S.C. 154(b) by 1453 days.

(21) Appl. No.: 11/399,926

(22) Filed: Apr. 7, 2006

(65) Prior Publication Data
US 2007/0249452 A1 Oct. 25, 2007

(51) Int. Cl.
*F16G 1/00* (2006.01)
*F16G 5/00* (2006.01)
*F16G 9/00* (2006.01)
*F16G 5/20* (2006.01)
*F16G 1/28* (2006.01)

(52) U.S. Cl.
CPC .. *F16G 5/20* (2013.01); *F16G 1/28* (2013.01)

(58) Field of Classification Search
CPC .............. F16G 5/06; F16G 5/20; F16G 1/28; B29C 66/71; C08L 21/00
USPC ........ 474/260, 261, 263, 266, 256, 253, 268
See application file for complete search history.

(56) References Cited

U.S. PATENT DOCUMENTS

| | | | | |
|---|---|---|---|---|
| 2,062,568 A | * | 12/1936 | Freedlander | 474/265 |
| 2,336,149 A | * | 12/1943 | Freedlander | 156/138 |
| 3,221,869 A | * | 12/1965 | Paasche | 198/847 |
| 3,343,425 A | * | 9/1967 | Terhune | 474/264 |
| 3,416,383 A | * | 12/1968 | Brooks et al. | 474/262 |
| 3,469,512 A | * | 9/1969 | Garbin et al. | 474/263 |
| 3,478,613 A | * | 11/1969 | Brooks et al. | 474/262 |
| 3,800,610 A | * | 4/1974 | Wach | 474/250 |
| 3,818,741 A | | 6/1974 | Terhune | |
| 3,937,094 A | * | 2/1976 | Cicognani | 474/205 |
| 3,964,329 A | * | 6/1976 | Wolfe | 474/263 |
| 4,031,768 A | | 6/1977 | Henderson et al. | |
| 4,096,764 A | * | 6/1978 | Richmond et al. | 474/263 |
| 4,139,406 A | | 2/1979 | Richmond et al. | |
| 4,392,842 A | * | 7/1983 | Skura et al. | 474/205 |
| 4,632,665 A | * | 12/1986 | Skura | 474/205 |
| 4,892,510 A | | 1/1990 | Matsuoka et al. | |
| 4,937,925 A | | 7/1990 | McGee, Jr. | |
| 5,284,456 A | | 2/1994 | Connell et al. | |
| 5,286,542 A | | 2/1994 | Susi et al. | |
| 5,362,281 A | * | 11/1994 | Dutton et al. | 474/205 |
| 5,415,594 A | * | 5/1995 | Kitahama et al. | 474/263 |
| 5,495,935 A | | 3/1996 | Zabron et al. | |
| 5,575,729 A | * | 11/1996 | Feldmann et al. | 474/260 |
| 5,643,378 A | | 7/1997 | White, Jr. et al. | |
| 5,645,504 A | | 7/1997 | Westhoff | |

(Continued)

FOREIGN PATENT DOCUMENTS

| | | |
|---|---|---|
| EP | 0 774 597 B1 | 4/1996 |
| EP | 1 108 750 A1 | 12/2000 |
| EP | 1 157 813 B1 | 5/2001 |

*Primary Examiner* — Henry Liu
(74) *Attorney, Agent, or Firm* — Paul N. Dunlap, Esq.; Jeffrey A. Thurnau, Esq.

(57) ABSTRACT

A power transmission belt comprising a body comprising a first elastomeric material and having tensile members running in a longitudinal direction, the body having a pulley engaging region having a profile; characterized in that the pulley engaging region comprises a surface region and a subsurface region; the subsurface region comprising a second elastomeric material having a friction modifying agent; and the surface region comprising a nonwoven fabric material co-mingled with the second elastomeric material.

24 Claims, 2 Drawing Sheets

(56) References Cited

U.S. PATENT DOCUMENTS

| | | | |
|---|---|---|---|
| 5,711,734 A * | 1/1998 | Shioyama et al. | 474/260 |
| 5,733,399 A | 3/1998 | Wood | |
| 5,741,197 A | 4/1998 | Akita et al. | |
| 5,851,635 A | 12/1998 | Di Giacomo et al. | |
| 5,971,879 A * | 10/1999 | Westhoff | 474/260 |
| 6,004,238 A | 12/1999 | Hayashi et al. | |
| 6,409,621 B1 * | 6/2002 | Billups et al. | 474/263 |
| 6,419,775 B1 | 7/2002 | Gibson et al. | |
| 6,461,264 B1 * | 10/2002 | Lofgren | 474/260 |
| 6,464,607 B1 * | 10/2002 | Rosenboom et al. | 474/263 |
| 6,491,598 B1 | 12/2002 | Rosenboom | |
| 6,595,883 B1 | 7/2003 | Breed et al. | |
| 6,609,990 B2 * | 8/2003 | Kopang | 474/264 |
| 6,695,733 B2 | 2/2004 | Knutson | |
| 6,793,599 B2 | 9/2004 | Patterson et al. | |
| 6,824,485 B2 * | 11/2004 | Edwards et al. | 474/260 |
| 6,855,082 B2 | 2/2005 | Moncrief et al. | |
| 6,918,849 B2 | 7/2005 | Gregg et al. | |
| 6,991,692 B2 * | 1/2006 | Patterson et al. | 156/137 |
| 2002/0183153 A1 * | 12/2002 | Patterson et al. | 474/263 |
| 2003/0017900 A1 * | 1/2003 | Kopang | 474/260 |
| 2003/0139242 A1 * | 7/2003 | Teves et al. | 474/263 |
| 2004/0009839 A1 * | 1/2004 | Edwards et al. | 474/260 |
| 2004/0048708 A1 | 3/2004 | Nonnast et al. | |
| 2004/0121868 A1 * | 6/2004 | Gregg et al. | 474/256 |
| 2004/0204275 A1 * | 10/2004 | Burrowes et al. | 474/263 |
| 2005/0037882 A1 * | 2/2005 | Hineno et al. | 474/263 |
| 2007/0249452 A1 * | 10/2007 | South | 474/263 |

* cited by examiner

POWER TRANSMISSION BELT

BACKGROUND OF THE INVENTION

The invention relates to power transmission belts having an engineered surface and more particularly, to power transmission belts having an engineered surface comprising a region having a nonwoven material and a friction reducing agent.

It is known in the art to make power transmission belts from elastomeric materials having an embedded tensile member. The belts may describe a multi-rib, toothed, v-belt, or flat profile. The belts run in pulleys having a matching profile.

It is known that the rib flank surfaces of V- and multi-v-rib belts are subject to sliding wear, temperature extremes, normal, tangential and frictional forces that cause belt noise, rib surface sloughing, slipping, and chatter. It is also known that power transmission capacity and belt longevity are functions of several factors, including the type of material contacting the pulley surfaces. These issues are conventionally addressed by incorporating a high loading of various fibers into the mix of the undercord materials that form the compressive layer of the belt. These fibers, or portions of them, are exposed when the V profile is cut or ground to form the belt from the cured belt slab. The resulting surface is a combination of the base polymer and exposed fibers. This technique is limited with regard to an engineering approach for composite design, and/or controlling friction, noise, and slippage. It also creates a stiff structure that resists bending, which can contribute to belt rib cracking and shortened belt life. Also, the addition of short fiber to the rubber under-cord material provides new flaw sites and stress risers from which cracks can initiate and propagate. Thus, the short fibers themselves can shorten the overall flex life of the belt. Representative of the art is U.S. Pat. No. 4,956,036 (1990) to Sedlacek which discloses a discontinuous fiber loaded compressive layer in a multi-v-ribbed belt. The belt is ground to create the required rib profile, thereby exposing the fibers. The elastomeric body portion is loaded with fiber preferably from about 0.5 to 20% by volume, with preferred loading at 3% by volume.

It is also known to address the above mentioned surface frictional problems by incorporating a friction modifying substance throughout the elastomeric body portion. Representative of the art is U.S. Pat. No. 5,284,456 to Connell et al. and U.S. Pat. No. 6,855,082 to Moncrief et al. This approach is limited by any adverse effects of the modifier on the physical properties of the belt body, and it results in wasteful use of modifier in non-surface regions and in ground-off portions of belt. In other art, a lubricant is coated, applied or treated onto the pulley contact surface of the belt. Representative of coating art is U.S. Pat. No. 5,851,635 to Di Giacomo et al., U.S. Pat. No. 6,004,238 to Hayashi et al., and U.S. Pat. No. 6,419,775 to Gibson et al. Coatings, applied in a thin layer to minimize dimensional impact to the profile, may not have sufficient durability. Coatings also require an additional manufacturing step.

It is also known to address the above mentioned problems by incorporating a nonwoven region on the rib flank surfaces. This permits the surface properties to be designed independently of the bulk of the belt structure. This technique is also limited. The nonwoven region may abrade and wear off, leaving exposed to the pulley a rib material which may have unsuitable friction and noise characteristics and reduced longevity. If the rib material must be designed for improved longevity, friction, and noise, for example by adding a friction reducing agent and/or fiber throughout, then the designer has not gained anything in design flexibility by having a separate nonwoven region. Representative of the art is U.S. Pat. No. 4,892,510 (1990) to Matsuoka which discloses a v-ribbed belt having a surface layer comprising a nonwoven fabric at the outer surface vulcanized to ribs solely made of rubber. The nonwoven fabric may be 0.1 to 0.3 mm thick and may contain a friction reducing agent.

Also representative of the art is U.S. Pat. No. 6,793,599 (2004) to Patterson et al. and U.S. Pat. No. 6,824,485 (2004) to Edwards et al. which disclose a v-ribbed belt having a nonwoven region on a pulley engaging surface, wherein the fiber-loaded elastomeric material of the belt body interpenetrates the nonwoven material. The fiber-loaded elastomeric material may also contain a friction-reducing or friction-modifying agent throughout the belt body and/or in the nonwoven region.

What is needed is a power transmission having a molded profile and an integrally molded, relatively thick, pulley-engaging region having a friction-modifying agent. What is needed is a power transmission belt having a nonwoven surface material on and commingled with a thicker, pulley-engaging region having a friction-modifying agent. What is needed is a power transmission belt with a multi-ribbed profile and having a nonwoven pulley-engaging surface layer and a compressive layer, with an in-between layer which interpenetrates the nonwoven layer and which has a friction-modifying agent to provide for longevity of low-noise performance. The present invention meets these needs.

BRIEF SUMMARY OF THE INVENTION

The primary aspect of the invention is to provide a power transmission belt having a pulley engaging region comprising a surface region and a subsurface region; both the surface and subsurface region comprising an elastomeric material having a friction modifying agent; and the surface region optionally comprising a fibrous nonwoven fabric material co-mingled with the elastomeric material.

Another aspect of the invention is to provide a belt having a pulley engaging region comprising an optional surface layer of nonwoven material and a subsurface layer of an elastomeric compound having a friction-modifying agent, wherein the elastomeric compound interpenetrates the nonwoven material and is distinct from the main body of the belt at least in that the compound comprises a friction-modifying agent which is not present in the main body of the belt, and the friction-modifying agent is fluoropolymer.

Another aspect of the invention is to provide a belt having a pulley engaging region comprising a surface layer of nonwoven material and a subsurface layer of an elastomeric compound having a friction-modifying agent, wherein the elastomeric compound interpenetrates the nonwoven material and is distinct from the main body of the belt, and the friction-modifying agent is polytetrafluoroethylene (PTFE) powder.

Other aspects of the invention will be pointed out or made evident by the following description of the invention and the accompanying drawings.

The invention comprises a belt having a region comprising a nonwoven material region on a pulley engaging surface. The nonwoven region is interpenetrated with an elastomeric compound which makes up a subsurface elastomeric layer. A predetermined amount of friction-modifying agent is included in the elastomeric compound of the elastomeric layer during compounding. The elastomeric compound is an integrally molded region of the belt profile. The friction-modifying agent in the elastomeric compound of the pulley-engaging region significantly reduces or eliminates slip noise, even when the nonwoven surface region has worn off.

DETAILED DESCRIPTION OF THE INVENTION

Figure 1:
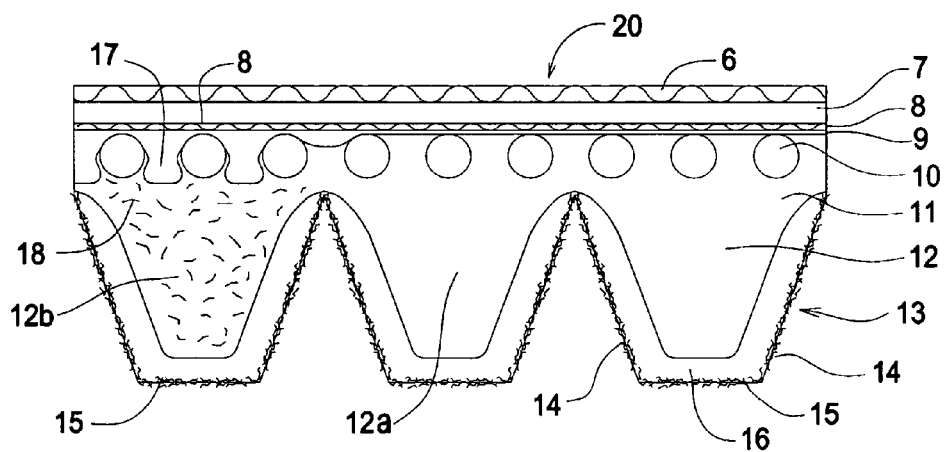
FIG. 1 is a cross-sectional view of an embodiment of the inventive belt.

FIG. 1 is a cross-sectional view of the inventive belt 20. Belt 20 comprises body 11 and pulley engaging ribs 12 running in a longitudinal direction. Belt 20 also comprises load carrying tensile members 10 that run along a longitudinal axis of the belt. Tensile members 10 may comprise, for example, aramid, polyester, nylon, glass, carbon or polyvinylalcohol (PVA) fibers. A polyester fiber may comprise, for example, polyethylene terephthalate or polyethylenenaphthalate.

Ribs 12 comprise an elastomeric rib material which may be comprised solely of rubber, as illustrated by rib 12a. Alternately, ribs 12 may further comprise fibers 18 dispersed throughout an elastomeric rib material as illustrated by rib 12b. The elastomeric material may comprise ethylene-propylene co- or ter-polymer (EPM or EPDM), ethylene-octene co- or ter-polymer (EOM), ethylene-butene co- or ter-polymer (EBM), styrene-butadiene rubber (SBR), nitrile-butadiene rubber (NBR), natural rubber (NR), hydrogenated nitrile rubber (HNBR), millable polyurethane (PU), polychloroprene and blends of these and their equivalents. The use of castable or liquid PU or the like for the elastomeric materials is not contemplated as within the scope the invention. Belt 20 may also comprise a jacket 6 and/or an overcord 7. Jacket 6 may comprise a fabric material of nylon, cotton or other appropriate equivalent fabrics. Jacket 6 may comprise a thermoplastic or thermoset material, such as nylon, polyurethane, polyethylene and their equivalents. Jacket 6 may be woven, knit, or nonwoven. Overcord 7 may be of any suitable elastomeric material.

Belt 20 may also comprise a cross-cord layer 8 adjacent to tensile members 10 across a width of the belt. Cross-cord layer 8 may be substantially non-porous so that essentially no elastomeric material penetrates cross-cord layer 8 during a molding process, thereby maintaining a proper tensile member position within the belt. Cross-cord layer 8 may comprise woven or nonwoven material, for example non-porous tire cord. A thin gum layer 9 may be disposed between cross-cord layer 8 and tensile members 10 in order to cushion tensile members 10 and thereby avoid abrading the tensile members. Alternately, a thicker gum layer 9 may extend between the tensile members 10, forming lobes 17 between the tensile members. An additional gum layer (not shown) may also be provided on the opposite side of the cord if complete encapsulation of the cord is desired. Alternately, cross-cord layer 8 may be porous, so that overcord 7 material interpenetrates the cross-cord material during molding, thus possibly forming lobes 17 between the tensile members with or without the use of gum layer 9.

Ribs 12 may comprise any number of ribs and any profile required by a user. FIG. 1 depicts a multi-v-ribbed profile. Though rib 12b is portrayed differently from rib 12a in order to illustrate different embodiments of the invention, it should be understood that the ribs 12 in multi-ribbed belts are generally all of the same construction. The belt may also comprise a single-rib v-belt profile or a toothed belt having transverse ribs or teeth.

Pulley engaging region 13 comprises pulley engaging surface region 14 and subsurface region 16. Surface region 14 may optionally comprise pulley engaging nonwoven region 15. Subsurface region 16 comprises an elastomeric friction material that is distinct from that of the body 11 and ribs 12. Pulley engaging nonwoven region 15 comprises a random array of fibrous, nonwoven fabric material comingled and interpenetrated with the material of the subsurface region 16, thereby forming nonwoven region 15. Nonwoven region 15 does not have a discrete boundary between the nonwoven containing area and the subsurface region 16. Due to the co-mingling, both optional nonwoven material and elastomeric friction material are present at a pulley engaging surface 14.

The elastomeric friction material of subsurface region 16 comprises a friction modifier. By way of example and not of limitation, friction modifiers may include waxes, oils, graphite, boron nitride, molybdenum disulfide, fluoropolymers, mica, talc, and various blends and equivalents thereof. Graphite friction modifier may be in particulate or fiber form. A friction modifier may comprise a metal salt of carboxylic acid as described in U.S. Pat. No. 6,824,485, which is hereby incorporated by reference. Preferred friction modifiers are of the solid or non-blooming-liquid type. This does not preclude the use of blooming frictional modifiers in this invention, such as those described in U.S. Pat. No. 5,284,456. The favorable effect of a frictional modifier thus persists for a long time, even after the surface region 14 or nonwoven region 15 is worn away in use. Thus, non-migratory frictional modifiers are continually refreshed as the surface wears away to expose underlying material. The optional nonwoven region 15 can thus be made as thin as desired. The subsurface region 16 can be designed to perform the desired functions of a surface frictional material. The rib 12 and body 11 may be designed to perform the load bearing functions of a compression layer without concern for frictional characteristics. The design flexibility is thus greater than the prior art. The thickness of the pulley engaging region 13 can be from about 0.025 mm to about 3 mm. Alternately, the thickness of the pulley engaging region 13 can be from about 0.12 mm to about 2.5 mm. This thickness may be distributed as desired between the nonwoven region 15 and the subsurface region 16. The thickness of the nonwoven region is a major contributor to the stiffness of the rib. Thus it is desirable to make the nonwoven region as thin as possible and the subsurface region at least thick enough to accommodate the amount of wear anticipated. The thickness of the subsurface region 16 may be uniform, or it may vary around the profile such as illustrated in FIG. 1. Thickness variation may be a result of a method of manufacture.

A fluoropolymer friction modifier for subsurface region 16 may be polytetrafluoroethylene (PTFE), tetrafluoroethylene-hexafluoropropylene copolymer (FEP), tetrafluoroethylene-perfluoro(propylvinyl ether) copolymer (PFA), or perfluoropolyether, perfluoroalkylether, and the like. A preferred fluoropolymer friction modifier is Zonyl® fluoroadditive, sold under that registered trademark by DuPont. A preferred fluoropolymer is PTFE or FEP powder.

The above-mentioned friction modifier is added to the elastomeric friction material of subsurface region 16 in an amount sufficient to impart the desired frictional characteristics. A friction modifier typically comprises from about 0.01 to about 10 volume percent of the elastomeric friction material. In a preferred embodiment the friction modifier comprises from about 1 to about 8 volume percent of the elastomeric friction material. In another preferred embodiment the friction modifier comprises from about 2 to about 5 volume percent of the elastomeric friction material.

A metal salt of carboxylic acid ("MCA") may be included in the elastomeric friction material of subsurface region 16 to control slip noise. The fatty acid used in the MCA may be selected from the group characterized as linear or branched, saturated or unsaturated fatty acids. More particularly, the fatty acid used in the MCA may be selected from the group characterized as eight carbon atom to twenty-four carbon atom carboxylic acids. The fatty acid may be selected from the group comprising saturated fatty acids including lauric, myristic, oleic, linoleic, palmitic, margaric, stearic, arachidic, behenic, ethylhexanoic or lingoceric acid and blends and equivalents thereof. The melting point for each of the foregoing fatty acids ranges from below room temperature in the case of ethylhexanoic acid up to 84.2° C. for lingoceric acid. These fatty acids may be produced synthetically (from non-naturally occurring materials) or may be derived from natural sources such as plant or animal glycerols. These melting point temperatures are generally in the operating range of the inventive belt. The fatty acids may be selected from the group characterized as carboxylic acids with the same numbers of carbon atoms, eight to twenty-four, but having one or more carbon-carbon double bonds, i.e. unsaturated, for example, erucic acid.

Metals used with the fatty acid in the MCA may be selected from Group IA, IIA, IIIA, IB, IIB, IVB, VIB, VIIB, or VIII of the Periodic Table, including without limitation beryllium, barium, titanium, chromium, molybdenum, manganese, iron, cobalt, nickel, copper, silver, cadmium, tin, lead, antimony, zinc, calcium, magnesium, sodium, lithium, potassium, or aluminum.

MCA may be used in the inventive belt, in lieu of the fatty acids without a metal atom, because fatty acids can inhibit peroxide cure of an elastomer. The metal atom on the acid group inhibits the detrimental effect of the acid group on the elastomeric peroxide cure. However, fatty acids not including a metal atom may be used to practice the invention if the detrimental effects of the acid group on the peroxide cure are of diminished importance to the product or process.

The MCA may be present in the elastomeric friction material formulation in the range of approximately 2 to 15 parts by weight per hundred parts of rubber or other elastomer (PHR). For MCA concentrations above the solubility limit, for example in the range of approximately 2 PHR up to approximately 10 PHR, a desirable portion of the MCA may exude onto or reside at the surface 14 or the surface of the belt nonwoven region 15. The excess MCA on the belt surface 14 interacts with a metal pulley groove.

The MCA may be added to the elastomeric friction material directly or formed in situ. More particularly and by way of example, zinc stearate can either be added directly to the rubber formulation or can be formed in situ by the use of zinc oxide and stearic acid in the compound, which react in a known manner during vulcanization to form zinc stearate.

Nonwoven region 15 may comprise a single layer or a plurality of overlaid layers of nonwoven material infused with elastomeric material. Further, the nonwoven region does not have the characteristic of uniformly spaced and aligned fibers as in a woven cloth or textile. Since the fibers comprising the nonwoven region are more or less randomly oriented, this reduces the creation and support of natural frequency harmonics one would expect in a more homogeneous material, i.e., where the fibers are more highly oriented. These harmonics comprise audio oscillation (noise) as well as low frequency oscillations of the belt vibrating between pulleys. A nonwoven region comprising substantially randomly oriented or non-oriented fibers tends to substantially damp these oscillations.

Nonwoven fabric materials may also be chosen to give a required frictional characteristic, permeability, thermal resistance, and wear resistance. A frictional modifier can be used in the nonwoven region 15 to help control the coefficient of friction of the outer surface of the nonwoven region. By way of example and not of limitation, friction modifiers may include waxes, oils, graphite, boron nitride, molybdenum disulfide, fluoropolymer, mica, talc, metal salt of carboxylic acid, and various blends and equivalents thereof as described in connection with the subsurface region 16. The friction modifier may be applied to the nonwoven material before assembly of the belt and thus may be in addition to the friction modifier contained in the interpenetrating elastomeric friction material of the subsurface region 16.

The nonwoven material may be cellulose-based with a basis weight in the range of about 4 $g/m^2$ up to about 90 $g/m^2$. The porosity, based on air permeability determined according to ASTM D737, of this nonwoven material may be in the range of from about 40 to about 800 $ft^3$/min per $ft^2$ at ½-inch of water pressure differential (about 20 to about 400 $cm^3/s$ per $cm^2$ at 12.7 mm water). The thickness of the nonwoven region 15 may be in the range of 0.025 mm or greater. The thickness may be in the range of from 0.025 to 0.6 mm. The average tensile strength may range from about 25 to about 2000 g/cm (based on the force per unit width to pull the sample). The tensile strength in the machine direction may be in the range of from about 230 to about 1015 g/inch (about 90 to about 400 g/cm). The tensile strength in the cross direction may be in the range of from about 66 to about 800 g/inch (about 25 to about 315 g/cm). The nonwoven may comprise a combination of softwood pulp and hardwood pulp. The nonwoven may comprise from 0% to 70% of softwood pulp. The nonwoven may comprise a combination of cellulosic fibers and synthetic fibers. The nonwoven may comprise a combination of softwood pulp and a blend of softwood pulp and synthetic fibers. The synthetic fibers may be any one or a blend of more than one selected from aramid, carbon, polyester, polyolefin, acrylic, polyimide, PVA, rayon, fiberglass, and nylon.

An exemplary embodiment uses a nonwoven with a basis weight of 4.6 $g/m^2$; porosity of 100 CFM per $ft^2$ per ½" $H_2O$ (51 $cm^3/s/cm^2$ at 12.7 mm water); tensile strength in the machine direction 550 g/inch (217 g/cm); tensile strength in the cross direction 250 g/inch (98 g/cm); and thickness of 0.051 mm. The nonwoven comprises 50% softwood and 50% hardwood. Two layers of nonwoven are preferably used.

Fibers 18 may be included in the matrix of the elastomeric body 11 and/or overcord 7, each separate from the subsurface region 16. Fibers may also be included in the subsurface region 16. Fibers 18 may further decrease rib surface sloughing and chatter. The fibers may be synthetic or natural, organic or inorganic and may include aramid, carbon, polyester, polyolefin, polyimide, polyvinyl alcohol (PVA), rayon, acrylic, fiberglass, and nylon, and blends and equivalents thereof. Other organic fibers may include wool, silk, hemp, cotton, and blends and equivalents thereof. The fibers may be in the form of chopped, ground, staple, flock, pulp and equivalents thereof. The amount of fibers used in the rib elastomer may be in the range of from about 0.01 to about 20 or 25 parts fiber per hundred parts of rubber (PHR). An exemplary embodiment utilizes from 0.01 to about 5 parts fiber per hundred parts of rubber. The nonwoven region allows a dramatic reduction in the percentage of flock or fiber loading required in the undercord rib materials. This change has resulted in improved belt performance due to enhanced resilience and bending of the undercord constructions.

The presence of friction modifier such as PTFE or surplus MCA at the nonwoven surface 14 significantly improves the slip noise performance of the inventive belt. In the case of MCA, this is believed to occur because the metal atom is relatively weakly bonded to the fatty acid. As a result the metal atom/fatty acid bond can be easily broken, making the fatty acid available for bonding or reforming to another metal atom, for example, on the metallic surface of a pulley, thereby modifying a frictional characteristic. Another possible explanation is that the metal atom in the MCA has a high affinity for the metal surface and thus interacts strongly with this metal surface. In so doing this places the fatty side of the molecule up and away from the metal surface forming at least a monolayer between the metal and the belt surface, thereby modifying a frictional characteristic. Modification of the frictional characteristic in this manner reduces or eliminates a slip noise between the belt and a pulley. The improvement in noise performance lasts even after the belt experiences significant wear, because of the presence of the elastomeric friction region under the nonwoven. The subsurface region can continue to provide improved wear and noise resistance after the surface nonwoven region has been worn away. Thus, the elastomeric material of the belt body 11 need not comprise a friction modifying agent and may thus be designed for other purposes, such as improved flex life, adhesion, or improved load capacity.

The elastomeric material formulations of the subsurface region, the belt body, and the overcord optionally but preferably include one or more additional conventional elastomeric additives, process and extender oils, antioxidants, waxes, pigments, plasticizers, softeners, tackifiers, fillers, activators, accelerators, scorch retarders, vulcanization agents, and the like, according to common rubber processing practice. For example, in a preferred embodiment of the present invention, the elastomeric materials also comprise carbon black, a plasticizer, antioxidants, coagent, peroxide, and a cure retarder.

An elastomer material formulation for the subsurface region 16 is shown in Table 1 as Material "A." The formulation is exemplary and is not offered to limit other possible formulations. An exemplary and non-limiting elastomer material for the belt body is Material "B" in Table 1.

TABLE 1

| Material | PHR (Parts per hundred elastomer) | |
|---|---|---|
| | A | B |
| EPM[1] | 100 | 100 |
| Carbon black | 50 | 60 |
| Antioxidants[2] | 7 | 1 |
| Zinc oxide | 0 | 2 |
| Zinc stearate | 0 | 5.7 |
| Paraffin oil | 0 | 10 |
| Nylon flock | 0 | 4 |
| Zinc dimethacrylate (w/0.5 retarder) | 15.5 | 14.8 |
| Friction Modifier | Variable - see text | 0 |
| Peroxide[3] (60% Active) | 3.2 | 3.2 |

[1]64% ethylene, 63 Mooney viscosity at 125° C.
[2]TMQ (polymerized 1,2-dihydro-2,2,4-trimethylquinoline) and ZMTI (Zinc 2-mercaptotolylimidazole)
[3]α,α'-bis(tert-butylperoxy)-diisopropylbenzene Method of Manufacture The inventive belt is built up on a mandrel in a series of layers. Jacket 6, if present, is laid up first. Elastomeric overcord 7 of the belt is laid-up next. Each succeeding elastomeric layer is laid upon the previously applied layer. Cross-cord layer 8 may be applied upon overcord 7. Tensile cords 10 are applied by helically winding onto cross-cord layer 8. A gum layer 9 may be applied between the tensile cords 7 and cross-cord layer 8 in order to provide a cushion for tensile cords 10. The elastomeric undercord or body 11 is then applied over the tensile cords 10. The elastomeric subsurface region 16 is applied last or next to last in a predetermined amount. The subsurface region 16 may comprise one or more layers of elastomeric material. The final layer optionally applied to the build upon the elastomeric subsurface layer 16 is the nonwoven material comprising region 15. In one embodiment, the combined thickness of the plied layers of the subsurface region and the nonwoven material if present is from about one fifth to about two thirds of the total thickness of all the undercord layers. In a preferred embodiment, the combined thickness of the plied layers of the subsurface region and the nonwoven material is about 30% to about 50% of the total thickness of all the undercord layers. In another preferred embodiment, the combined thickness of the plied layers of the subsurface region and the nonwoven material is about one third of the total thickness of all the undercord layers. In other words, the ratio of the combined thickness of the subsurface plied layers and the nonwoven material to the thickness of the elastomeric undercord may be from about 1:4 to about 2:1, or preferably from about 42% to about 100%, or preferably about one half.

The nonwoven region may comprise one or more layers of nonwoven material. The nonwoven layer or layers have the added advantage of allowing gases developed during the curing process to vent or escape from the edges of the mold. Venting of gases from the mold facilitates proper interpenetration of the elastomeric material of the subsurface layer into the nonwoven material, thereby forming region 15. In the absence of a nonwoven region, alternate means of venting gases may be necessary, such as vent holes in the mold, strings, bump cycles, vacuum or the like.

The belt build is then subjected to curing pressures and temperatures sufficient to vulcanize and mold the belt, as is well known in the art. For example the fabrication process may include evacuating the air from inside the mold; applying steam pressure on the outside shell to a range of about 175 to 235 psig (about 1.2 to 1.62 MPa) for about 2 to 10 minutes; then applying steam pressure on the inside of the mold to a range of about 85 to 210 psig (about 0.59 to 1.45 MPa); and curing for about 10 to 20 minutes. Once cooled, the cured belt build is then separated from the mandrel and cut to the appropriate belt widths. The optimum rib shapes are achieved with process pressures on the high end of the range. Hydraulics or other methods known in the art (pneumatic, mechanical, and the like) can also be used to apply pressure to the belt, in conjunction with concurrently applied electric heat for curing in lieu of steam cure. The pressure range for a hydraulic cure may be about 85 to 500 psig (about 0.59 to 3.45 MPa). The temperature range may be about 250 to 500° F. (about 120 to 260° C.). This method of curing broadens the choice of rubber stocks to include many with relatively poor scorch safety and/or relatively high viscosity.

Application of pressure prior to curing infuses the elastomeric subsurface material into the optional nonwoven material while forming the profile. The elastomeric material then occupies the interstices between the individual fibers comprising the nonwoven material. This results in a region 15 of nonwoven material wherein the nonwoven materials are co-mingled and interpenetrated with the elastomeric material.

The following examples are submitted for the purpose of illustrating the nature of the invention and are not intended as a limitation on the scope thereof.

EXAMPLES

Noise, friction and durability tests were conducted on an exemplary belt constructed using the formulae noted previously in Table 1. The inventive belt was compared with prior art belts without a subsurface friction-modified region interpenetrating a nonwoven pulley contact surface. The results indicate that misalignment noise generated by the inventive belt is significantly reduced. The inventive belt is also quieter and exhibits a more stable frictional behavior over time.

The test belts comprised an overcord 7, cross-cord 8, gum layer 9, tensile cords 10, a compression section or body 11, a subsurface region 16, and a nonwoven region 15 as described in FIG. 1. The test belts were all EPM-based with polyester tensile cords, nylon cross cord, and two layers of nonwoven of 50% softwood and 50% hardwood. The nonwoven had a basis weight of 4.6 g/m$^2$; porosity of 100 CFM per ft$^2$ per ½" H$_2$O pressure drop; tensile strength in the machine direction 550 g/inch; tensile strength in the cross direction 250 g/inch; and thickness of 0.051 mm. The nonwoven comprised 50% softwood and 50% hardwood. The thickness of the nonwoven region was about 0.1 mm. The subsurface region comprised Material A of TABLE 1 and was about 0.7 mm thick. The belt body 11 was Material B of TABLE 1. The test belts had six ribs, with 0.85 inch top width, and 1200 mm length.

Comparative Example A

The belt Ex. A had no friction-modified subsurface region 16.

Example 1

The belt Ex. 1 comprised 10.75 PHR (3 volume %) of Zonyl MP1100 powdered PTFE friction modifier in the subsurface elastomeric composition.

Example 2

The belt Ex. 2 comprised 18.3 PHR (5 volume %) of Zonyl MP1100 friction modifier in the subsurface elastomeric composition.

Example 3

The belt Ex. 3 comprised 30.2 PHR (8 volume %) of Zonyl MP1100 friction modifier in the subsurface elastomeric composition.

Example 4

The belt Ex. 4 comprised 19.23 PHR (8 volume %) of carbon fiber friction modifier of about 0.15 mm average length.

Figure 2:
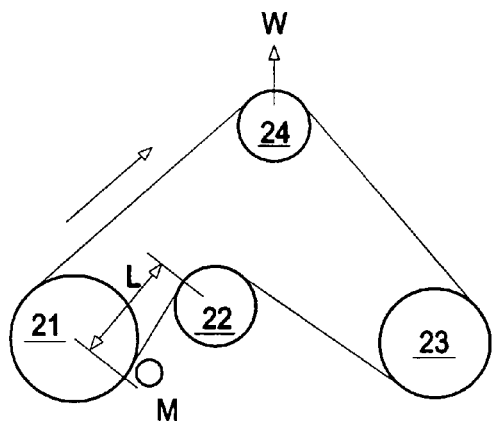
FIG. 2 depicts a misalignment test pulley configuration.
Figures 4, 5:
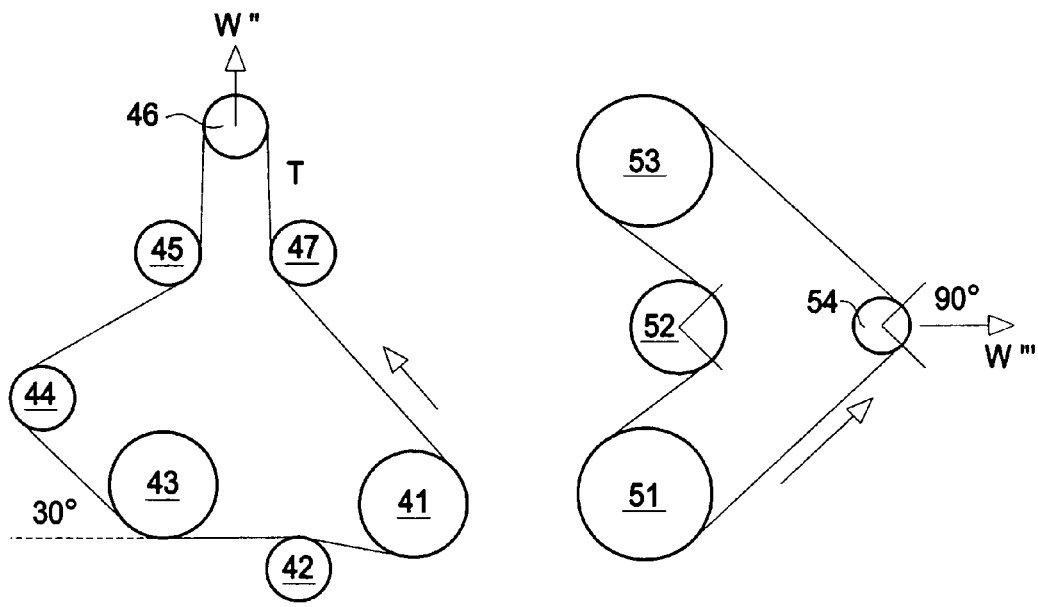
FIG. 4 depicts a coefficient of friction (COF) test pulley configuration.
FIG. 5 depicts a four-point break-in test pulley configuration.

In the misalignment noise test, the inventive belts exhibited a noise reduction in the range of 12 dB to 17 dB for 1.5 to 2.5 degrees of misalignment (MA) as compared to a belt without a friction-modified subsurface region. The inventive belts exhibited noise generation slightly less than that of standard belts with no misalignment. The misalignment noise test was conducted on a four-point drive as shown schematically in FIG. 2. Referring to FIG. 2, pulleys 21, 23, and 24 have multi-v-rib profiles and diameters of 159, 101, and 61 mm, respectively. Pulley 23 is the driver, turning at 1000 rpm clockwise. Pulley 22 is an idler with diameter of 80 mm. Pulley 22 can be displaced perpendicular to the plane of the layout, producing a misalignment angle over span L. A tension of approximately 267 N was applied to the test belt by means of dead weight W of 489 N. Then pulley 22 was offset by a certain amount and the noise measured by microphone M. The belts were first conditioned for 96 hours on a four-point drive at 5-10° C. and about 95% relative humidity. This break-in period was sufficient to remove at least a significant portion of the nonwoven layer. The four-point drive used to break in the belts is depicted in FIG. 5. Referring to FIG. 5, pulleys 51, 53, and 54 have multi-v-rib profiles and diameters of 120.65, 120.65, and 60 mm, respectively. Pulley 51 is the driver, turning at 4900 rpm counter-clockwise. Pulley 52 is an idler with diameter of 76.2 mm. Pulley 53 provides a 20.3 Nm driven torque. A tension was applied to the test belt by means of dead weight W''' of 90.7 kg.

The misalignment noise test results are shown in TABLE 2. One can see that the belts having a friction modifier in an elastomeric compound in a subsurface region of the pulley engaging nonwoven region run significantly quieter than a belt without the subsurface region.

TABLE 2

| Ex. | Noise at 0° MA | Noise at 1.5° MA | Noise at 2° MA | Noise at 2.5° MA |
|---|---|---|---|---|
| 1 | 75.8 dB Max | 75.8 dB Max | 76.3 dB Max | 76.8 dB Max |
| 2 | 76.1 | 75.7 | 77.1 | 76.6 |
| 3 | 76.8 | 76.3 | 76.6 | 76.3 |
| 4 | 79.5 | 77.8 | 77.4 | 94.1* |
| A | 79.8 | 90.1 | 90.3 | 93.2 |

*Only one of three test belts made noise.

Figure 3:
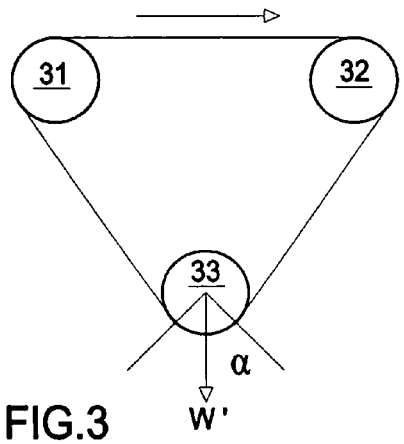
FIG. 3 depicts a forced-slip test pulley configuration.

In a 96-hour forced-slip test, the inventive belt of example 1 ran quietly, while the comparative example A made a frictional noise from about 24 hours on. The forced-slip test was conducted on a three pulley system as shown in FIG. 3. Referring to FIG. 3, pulleys 31, 32 and 33 each have a diameter of 60 mm and a belt wrap α of 60 degrees. The driver pulley 31 operates at about 2000 RPM clockwise, and driver pulley 32 at about 4% lower speed than pulley 31. The ambient temperature is 23° C. A vertical load W' of 180 N/rib is applied to driven pulley 33.

The belts were removed to test the COF and misalignment noise at intervals of 450 kilocycles (kc) (approximately 24 hours) throughout the forced-slip test. The inventive belt, example 1, exhibited less change in COF during the first 450-kc period and lower COF throughout the test than the comparative example A. The COF test was conducted on a layout as shown in FIG. 4. Referring to FIG. 4, test pulley 43 and driver pulley 41 both have a multi-v-rib profile and diameter of 141.5 mm. Pulleys 42, 45, and 47 are idlers. Pulley 44 is positioned to maintain a 30-degree wrap angle on pulley 3. Driver pulley 1 is turned at 400 rpm. Weight W" of 360 N is applied to pulley 46 to provide a belt tension T of 180 N. Torque is applied to test pulley 43, ramping up from zero torque until the pulley stops turning. The COF is calculated from the maximum torque observed. The test is similar in design to SAE J2432-2000. The misalignment noise was tested as described above.

Figure 6:
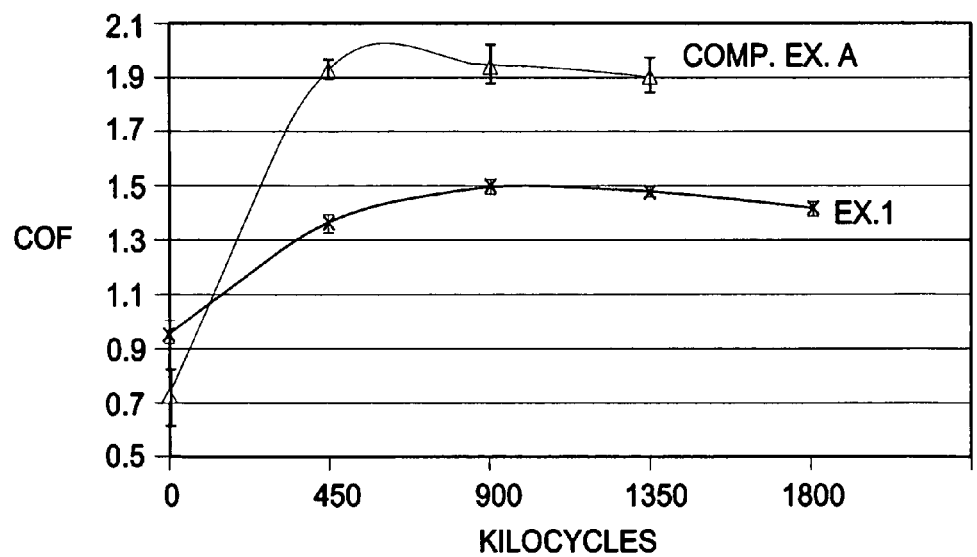
FIG. 6 depicts the belt COF results versus time on a forced-slip test.

FIG. 6 depicts the results of the daily COF measurements during forced slip testing. It can be seen that the comparative belt exhibited a dramatic increase in COF during the first 450-kc period. A misalignment noise was heard at 450 kc and all subsequent times of noise testing. In contrast, the inventive belt, example 1, showed much less initial change in COF and ran quietly on the misalignment test at every stage of the forced-slip test. The nonwoven layer of example 1 was substantially worn off within the first 450-kc period on the forced slip test, and substantially worn off by the end of the test thus exposing a significant amount of the frictionally modified under-layer. These COF test results demonstrate the efficacy of the subsurface friction-modified layer in improving the longevity of low-noise performance of the inventive belts. The inventive belt of example 2 performed essentially the same as example 1 on the periodic COF tests, so for clarity, only example 1 is included in FIG. 6.

Various nonwoven compositions are effective in reducing slip noise in combination with the elastomer of the subsurface region. The nonwoven material composition used in nonwoven region 15 may include 100% softwood, a hardwood/softwood blend, a softwood/synthetic blend, and 100% hardwood. The examples in Table 3 are exemplary nonwoven composition ratios and are not offered as limitations. The ratios in TABLE 3 are offered as illustrative of a range of ratios for nonwoven layer compositions and are not offered by way of limitation.

TABLE 3

|   | Softwood | Hardwood | Synthetic |
|---|---|---|---|
| A | 100% | 0% | 0% |
| B | 50% | 50% | 0% |
| C | 75% | 25% | 0% |
| D | 70% | 0% | 30% |
| E | 85% | 0% | 15% |
| F | 0% | 100% | 0% |
| G | 50% | 0% | 50% |
| H | 30% | 0% | 70% |
| I | 0% | 0% | 100% |

The synthetic fibers used alone or combined with the softwood in the nonwoven synthetic softwood blend (D, E, G, H, and I) include aramid, carbon, polyester, polyethylene, polyolefin, acrylic, fiberglass and nylon and blends and equivalents thereof. Other organic fibers that may be used with the softwoods may include wool, hemp, cotton, and blends and equivalents thereof. A 100% hardwood composition (F) may be accomplished using a wood flour or highly processed pulp.

Although forms of the invention have been described herein, it will be evident to those skilled in the art that variations may be made in the construction and relation of parts without departing from the spirit and scope of the invention described herein. The invention disclosed herein may suitably be practiced in the absence of any element that is not specifically disclosed herein.

What is claimed is:

1. A belt comprising: a body and tensile members running in a longitudinal direction, the body having a pulley engaging region having a molded profile; the molded profile consisting of a surface layer around the profile, a main body portion comprising a first vulcanized elastomeric material, and a subsurface layer in between the surface layer and the main body portion; the subsurface layer consisting of a second vulcanized elastomeric material having a friction modifying agent; said first elastomeric material free of said friction modifying agent; and wherein the surface layer comprises a fibrous nonwoven fabric material co-mingled with the second elastomeric material; and wherein the friction modifying agent is a particulate solid or a non-blooming liquid.

2. The belt of claim 1, wherein the friction modifying agent is at least one selected from the group consisting of waxes, oils, graphite, molybdenum disulfide, fluoropolymer, metal salt of carboxylic acid, boron nitride, mica, and talc.

3. The belt of claim 1, wherein the friction modifying agent comprises a fluoropolymer selected from the group consisting of PTFE, PFA, and FEP; and said first elastomeric material does not comprise said friction modifying agent.

4. The belt of claim 1, wherein the friction modifying agent is PTFE powder.

5. The belt of claim 1, wherein the first elastomeric material comprises a fiber loading in the range of about 0.01 to about 20 parts per hundred parts elastomer, and wherein the second elastomeric material has no fiber loading.

6. The belt of claim 5, wherein the fiber loading is in the range of 0.01 to 5 parts per hundred parts elastomer.

7. The belt of claim 6, wherein fiber loading fibers are selected from the group consisting of aramid, acrylic, carbon, polyester, polyolefin, acrylic, polyimide, PVA, rayon, fiberglass, and nylon or two or more of the foregoing.

8. The belt of claim 1, wherein the pulley engaging region has a thickness of from about 0.025 mm to about 3.0 mm.

9. The belt of claim 1, wherein the pulley engaging region has a thickness of from about 0.025 mm to about 0.6 mm.

10. The belt of claim 1, wherein the nonwoven material comprises a combination of softwood pulp and hardwood pulp.

11. The belt of claim 1, wherein the nonwoven material comprises a combination of cellulosic fiber and synthetic fiber.

12. The belt of claim 11, wherein the synthetic fiber comprises one of polyamide, acrylic, rayon, fiberglass, polyolefin, polyester, carbon, aramid, and a combination of two or more of the foregoing.

13. The belt of claim 12 wherein the synthetic fiber comprises from 50% to 100% by weight of the fibers of the nonwoven material.

14. The belt of claim 1, wherein the surface layer comprises at least two layers of the fibrous nonwoven fabric material.

15. The belt of claim 1, wherein the molded profile is a multi-v-ribbed profile.

16. The belt of claim 1, wherein the molded profile is a v-belt profile.

17. A method of manufacturing a belt comprising the steps of:
- laying up a first elastomeric and/or textile layer of a belt build on a mandrel;
- laying up tensile cords on the first elastomeric and/or textile layer;
- laying up a second elastomeric layer on the tensile cords;
- laying up a third elastomeric layer comprising a friction-modifying agent directly on the second elastomeric layer, wherein the second elastomeric layer is free of said friction-modifying agent;
- laying up a fibrous nonwoven fabric material on the third elastomeric layer;
- curing the belt build in a profile-forming mold whereby said third elastomer layer forms a sub-surface layer comprising said friction-modifying agent along said profile between the nonwoven fabric material and the second elastomeric layer; and
- cutting the belt build to predetermined belt widths.

18. The method of claim 17 wherein said curing further results in co-mingling of said third elastomer and said fibrous nonwoven fabric in said surface layer and further results in said second elastomer forming a main body portion of said belt with said third elastomer forming a subsurface layer in between said surface layer and said main body portion.

19. The method of claim 17 wherein the thickness of the third elastomeric layer is from about one fourth to about twice the thickness of the second elastomeric layer.

20. The method of claim 18 wherein the combined thickness of the third elastomeric layer plus the nonwoven material is from about one fourth to about twice the thickness of the second elastomeric layer.

21. The method of claim 18 wherein the friction-modifying agent is at least one selected from the group consisting of waxes, oils, graphite, carbon fiber, molybdenum disulfide, fluoropolymer, metal salt of carboxylic acid, boron nitride, mica, and talc.

22. The method of claim 18 wherein the friction-modifying agent is fluoropolymer, and the second elastomeric material is free of said friction-modifying agent.

23. A frictional power transmission belt comprising:
- a body comprising tensile members and at least one rib running in a longitudinal direction;
- said rib having an integrally molded, pulley engaging profile;
- said rib consisting of:
  - a surface layer around the profile of the rib,
  - a rib material comprising a first vulcanized elastomeric material and forming the bulk of the rib, and
  - a subsurface layer in between the surface layer and the rib material;
- the subsurface layer consisting of a second vulcanized elastomeric material having a friction modifying agent;
- said second elastomeric material distinct from said first elastomeric material; and
- wherein the surface layer comprises a fibrous nonwoven fabric material co-mingled with the second elastomeric material; and wherein the friction modifying agent is a fluoropolymer powder.

24. The belt of claim 23 comprising a plurality of said ribs, and wherein said profile is a multi-v-ribbed profile and said first elastomeric material is free of said friction modifying agent.

* * * * *